US012466217B2

(12) United States Patent
Yennie et al.

(10) Patent No.: US 12,466,217 B2
(45) Date of Patent: Nov. 11, 2025

(54) REINFORCEMENT OF POLYMERS WITH SHAPE MEMORY ALLOY ELEMENTS (71) Applicant: The SMART Tire Company Inc., Akron, OH (US)

(72) Inventors: Brian Yennie, Upland, CA (US); Earl Cole, Studio City, CA (US); Jim Benzing, North Canton, OH (US)

(73) Assignee: THE SMART TIRE COMPANY, Akron, OH (US)

( * ) Notice: Subject to any disclaimer, the term of this patent is extended or adjusted under 35 U.S.C. 154(b) by 185 days.

(21) Appl. No.: 17/946,402

(22) Filed: Sep. 16, 2022

(65) Prior Publication Data

US 2023/0081635 A1 Mar. 16, 2023

Related U.S. Application Data (60) Provisional application No. 63/244,928, filed on Sep. 16, 2021.

(51) Int. Cl.
B60C 9/00 (2006.01)
B33Y 70/00 (2020.01)
B33Y 80/00 (2015.01)

(52) U.S. Cl.
CPC .......... *B60C 9/0007* (2013.01); *B60C 9/0057* (2013.01); *B33Y 70/00* (2014.12); *B33Y 80/00* (2014.12); *B60C 2009/0014* (2013.01); *B60C 2009/0021* (2013.01); *B60C 2009/0071* (2013.01)

(58) Field of Classification Search
None
See application file for complete search history.

(56) References Cited

U.S. PATENT DOCUMENTS

| | | | |
|---|---|---|---|
| 4,391,318 A | 7/1983 | Maxey | |
| 6,237,663 B1 | 5/2001 | Cipparrone | |
| 9,416,250 B2 | 8/2016 | Belin | |
| 10,427,461 B1 | 10/2019 | Padula | |
| 10,449,804 B1 * | 10/2019 | Padula | B60C 9/0007 |
| 2001/0012558 A1 * | 8/2001 | Cipparrone | D07B 1/062 428/295.7 |
| 2002/0157750 A1 * | 10/2002 | Riva | B60C 9/2204 152/531 |
| 2004/0127616 A1 * | 7/2004 | Wentworth | C08L 59/00 524/284 |

(Continued)

FOREIGN PATENT DOCUMENTS

| | | | |
|---|---|---|---|
| CA | 1113367 A | 12/1981 | |
| DE | 10122812 A1 * | 11/2002 | B60C 9/0007 |

(Continued)

OTHER PUBLICATIONS van Ooij—Rubber adhesion to brass-plated steel cords—1979 (Year: 1979).*

(Continued)

Primary Examiner — John Vincent Lawler
(74) Attorney, Agent, or Firm — Jeffer Mangels; Butler & Mitchell LLP; Brennan C. Swain, Esq.

(57) ABSTRACT

Shape memory alloy elements ("SMAs") are bonded, encased, or encapsulated with one or more polymers to form an integrated component with unique elastic, pseudoelastic, and load-bearing properties.

16 Claims, 5 Drawing Sheets

(56) References Cited

U.S. PATENT DOCUMENTS

| | | | |
|---|---|---|---|
| 2008/0202637 A1 | 8/2008 | Hector | |
| 2009/0315696 A1 | 12/2009 | Browne | |
| 2011/0024010 A1* | 2/2011 | Browne | B60C 11/00 152/209.5 |
| 2012/0048440 A1* | 3/2012 | Lettieri | B60C 9/16 152/269 |
| 2013/0298548 A1 | 11/2013 | Chen | |
| 2015/0337111 A1* | 11/2015 | Belin | B60C 1/0041 524/381 |
| 2022/0227167 A1 | 7/2022 | Anderfaas | |
| 2022/0324253 A1 | 10/2022 | Rimai | |

FOREIGN PATENT DOCUMENTS

| | | |
|---|---|---|
| EP | 0629652 A1 | 12/1994 |
| EP | 2576212 B1 | 1/2020 |
| WO | 2021120624 A1 | 6/2021 |
| WO | 2022056098 A1 | 3/2022 |

OTHER PUBLICATIONS

Fidan—DE 10122812 A1—MT—shape memory tire w-coating for adhesion—2002 (Year: 2002).*

International Search Report and Written Opinion issued in PCT/US22/43787 (Originally Mailed Jan. 3, 2023).

Lohse et al. "Hinged Adaptive Fiber-Rubber Composites Driven by Shape Memory Alloys-Development and Simulation". materials, vol. 15 Issue 11 (May 27, 2022): pp. 1-20; entire document, but especially: abstract, p. 5 para 4, table 1, p. 7 pare 2, fig. 3, fig. 4.

Lohse et al. "Experimental and Numerical Analysis of the Deformation Behavior of Adaptive Fiber-Rubber Composites with integrated Shape Memory Alloys" materials, vol. 15 Issue 2 (Jan. 13, 2022); pp. 1-23; entire document, but especially: abstract, p. 5 para 3, fig. 5.

International Search Report and Written Opinion issued in PCT/US2023/085121 (Originally mailed Apr. 10, 2024).

* cited by examiner

REINFORCEMENT OF POLYMERS WITH SHAPE MEMORY ALLOY ELEMENTS

CROSS-REFERENCE TO RELATED APPLICATIONS

This application claims the benefit of U.S. Provisional Application No. 63/244,928, filed on Sep. 16, 2021, the entirety of which is incorporated by reference herein.

FIELD OF THE INVENTION

The present invention relates to shape memory alloys ("SMAs"), particularly to SMAs being structurally combined with polymers to be used in various applications.

BACKGROUND OF THE INVENTION

The prior art primarily focuses on the combination of steel with vulcanized rubber (e.g., as used in tires). Bonding of steel with rubber is a common yet specific process that involves brass-coating the steel and vulcanizing the rubber in the presence of sulfur compounds to create a unique chemical bond, and relies on a strong bond between the steel and the brass. U.S. Pat. No. 4,391,318 is incorporated by reference herein in its entirety. EPO Patent No. EP2576212B1 is also incorporated by reference herein in its entirety.

SMAs are metals having unique properties compared to other metals. SMAs have a pseudoelasticity that allows for an order of magnitude greater recoverable strain than steel. The unique chemistry and material properties of SMAs (e.g., nickel titanium ("NiTinol") provides advantages such as high elasticity and strength. SMAs have a lower stiffness than steel, and thus may be utilized for their elastic properties while steel is generally used for reinforcement in similar applications. As such, improvements in the art utilizing advantages derived from material properties of SMAs are desirable.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

The present invention includes the use of SMAs in combination with polymers to create structures with combined properties of elasticity and strength as well as bonding, encapsulating, and encasing SMA elements in a polymer. SMA structures are combined with polymers to create structures that have both high elasticity and strength without the need for a pneumatic element (in the case of tires, pressurized air). In a preferred embodiment, the present invention is a toroidal SMA structure encapsulated in polyurethane or another polymer that is bonded to a rubber tread to form an airless tire with properties similar to a pneumatic tire.

A preferred embodiment is embodied in an SMA assembly. The SMA assembly includes and SMA structure. The SMA structure is encased in a polymer. The SMA structure includes an SMA element.

This and other embodiments may optionally include the following. The SMA element may include at least one of NiTi, Ag—Cd, Au—Cd, Cu—Al—Ni, Cu—Sn, Cu—Zn, Fe—Pt, Mn—Cu, Fe—Mn—Si, Co—Ni—Al, Co—Ni—Ga, Ni—Fe—Ga, Ti—Nb, β-Ti alloys, ternary alloys, or quaternary alloys of a material of the SMA element. The SMA element may be a wire, sheet, spring, or foam.

The SMA element may be multiple SMA elements. The SMA elements may be mechanically combined. The multiple SMA elements may include multiple springs that may be interwoven with each other. The multiple SMA elements may include a spring and a wire. The spring and the wire may be interwoven with each other. The multiple SMA elements may be arranged to form a helical or toroidal shape.

The polymer may be one of natural rubber, synthetic rubber, vulcanized rubber, polyurethane, nylon, acrylic, or another thermoset or thermoplastic polymer. The polymer may be 3D printed onto the SMA structure.

The SMA assembly may further include an outer and nearly monomolecular microporous metal coating that may be disposed over the SMA element. The coating may be selected from at least one of zirconium, cerium, lanthanum, nickel, cobalt, tin, titanium, zinc, copper, brass, and bronze plated. The SMA assembly may further include a second layer of coating configured to be disposed over the SMA element. The second layer of coating may include the same one or more materials of the outer coating or one or more materials different than those of the outer coating. The SMA assembly may further include a benzotriazole or another corrosion inhibitor configured to be applied to the SMA element.

The SMA element may be an SMA wire. The SMA wire may be used as a core of a drawn filled tube. The drawn filled tube may include a sheathing material. The sheathing material may include a metal or a polymer. The SMA element may bond to the polymer via a vulcanizing adhesive, solvent-based adhesive, water-based adhesive, or epoxy. The polymer may be a first polymer bonded to a second polymer. The first polymer and the second polymer may be different materials from each other.

The SMA assembly may further include a prepolymer or a resin. The prepolymer or the resin may be applied to the SMA element via a pre-formed mold and a curing process. The curing process may include rotational molding, rotational casting, spin casting, injection molding, extrusion, blow molding, thermoforming, expanded bead foam molding, or extruded foam molding.

Another preferred embodiment is embodied in a tire assembly. The tire assembly includes a body defined by an SMA structure. The SMA structure includes an SMA element. The tire assembly further includes a polymer layer. The polymer layer is configured to encase the body.

Yet another preferred embodiment is embodied in an SMA assembly. The SMA assembly includes an SMA structure. The SMA structure includes a first spring and a second spring interwoven with each other. The first spring has a larger diameter than a diameter of the second spring. The SMA has a toroidal shape. The SMA assembly further includes a polymer layer configured to encase the SMA structure.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward" and "below" used herein are merely for ease of description and refer to the orientation of the components as shown in the figures. It should be understood that any orientation of the components described herein is within the scope of the present invention.

The FIGS. are generally directed to a tire assembly 10. In some embodiments, the tire assembly 10 may instead be characterized as an SMA assembly that may be used for other purposes where air or pneumatic pressure would otherwise be used within a polymer structure. Since the tire assembly 10 is functional without air or pneumatic pressure, use of the tire assembly 10 is advantageous in rugged terrain where conventional tires are prone to flats and environments where air is lacking or not present (e.g., space, other planets, moons, etc.). In addition to enhanced durability, the tire assembly 10 advantageously provides lower rolling resistance than pneumatic tires, which contribute to greater fuel efficiency in vehicles. The use of the SMA assembly as the tire assembly 10 is only exemplary and is not a limitation on the present invention. In a preferred embodiment, the SMA tire assembly 10 generally includes a toroidal SMA structure 12 encapsulated in a polymer member or structure 14 (such as polyurethane) and then bonded to a polymer outer tread 16. It will be appreciated that the SMA structure 12 may be other enclosed or unenclosed shapes, such as tubular, spherical, helical etc.

Figure 1:
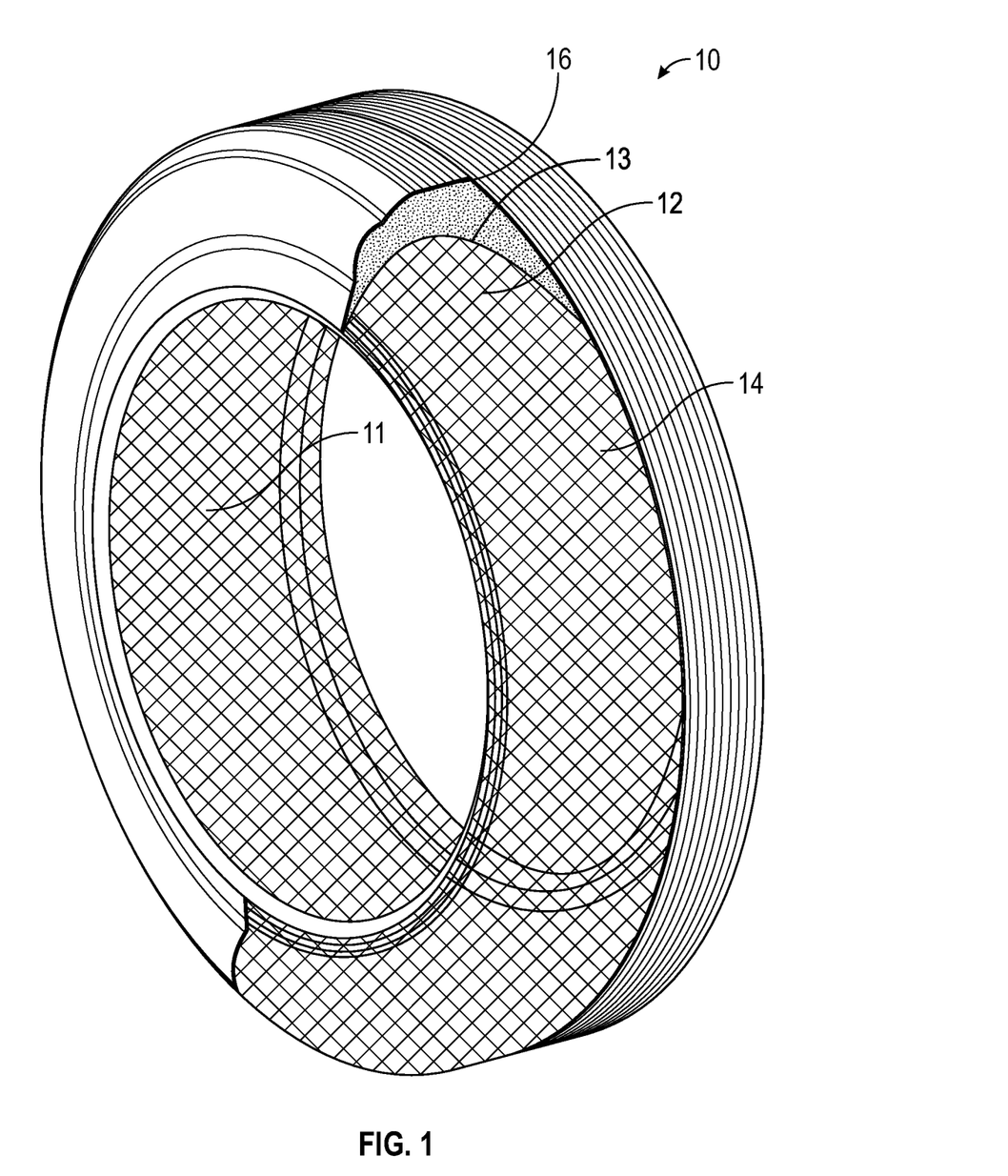
FIG. 1 is a perspective view of a tire assembly in accordance with a preferred embodiment of the present invention.

FIG. 1 is a perspective view of the tire assembly 10. The tire assembly 10 may be shaped and sized for various use including but not limited to automobiles, bicycles, motorcycles, and, scooters. The tire assembly 10 may have a recessed or indented inner surface 11. The recess or indentation of the inner surface 11 may allow the tire assembly 10 to be mated with a wheel or a rim 18 to then be attached to a vehicle. The tire assembly 10 may include the SMA structure 12 and the polymer member 14. The SMA structure 12 is shown in FIG. 1 as a spring toroid encased with a polymer (e.g., rubber) outer tread 16 to form an airless tire. The The SMA structure 12 may include SMA elements. The SMA elements may collectively form the SMA structure. In some examples, the SMA elements may be uniform in size, shape, and/or material properties. In some examples, the SMA elements may be different than each other in size, shape, and/or material properties. For example, an SMA element may be a wire, a spring, a sheet, a fiber, foam, and/or the like. The SMA element may include one or more of NiTi, Ag—Cd, Au—Cd, Cu—Al—Ni, Cu—Sn, Cu—Zn, Fe—Pt, Mn—Cu, Fe—Mn—Si, Co—Ni—Al, Co—Ni—Ga, Ni—Fe—Ga, Ti—Nb, β-Ti alloys, or ternary alloys or quaternary alloys of a material of the SMA element. The SMA elements may be attached together to form the SMA structure 12. For example, the SMA elements may be interwoven with each other.

The polymer outer tread 16 may be disposed over the SMA structure 12. The polymer outer tread 16 may enclose an outer surface 13 of the SMA structure 12. The polymer outer tread 16 may be rubber and/or another material having similar properties to rubber. The polymer outer tread 16 may have protrusions, bumps, threads, grooves, channels, cavities, and/or the like to provide additional grip.

Figure 2:
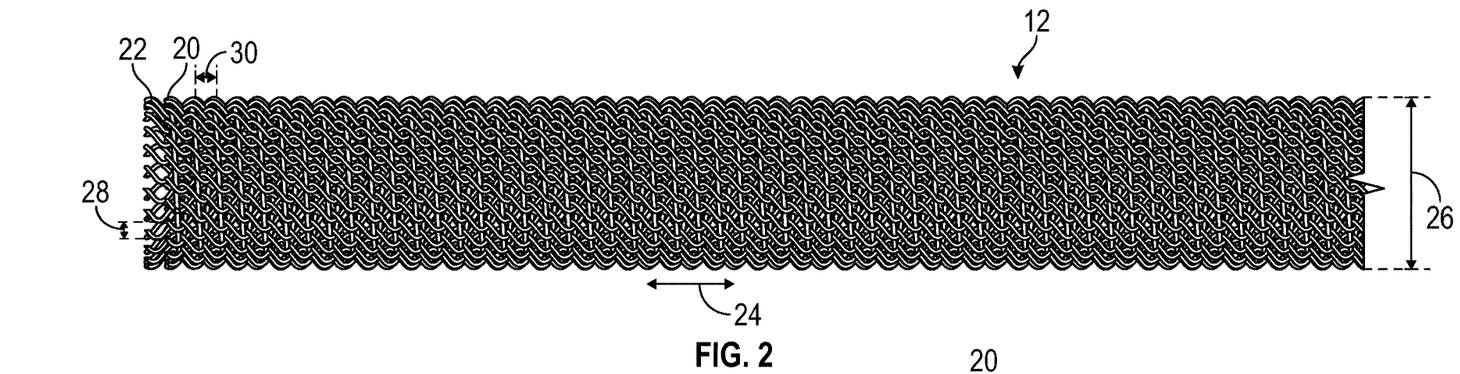
FIG. 2 is a sectional view of the tire assembly of FIG. 1 isolating SMAs in accordance with a preferred embodiment of the present invention.
Figure 3:
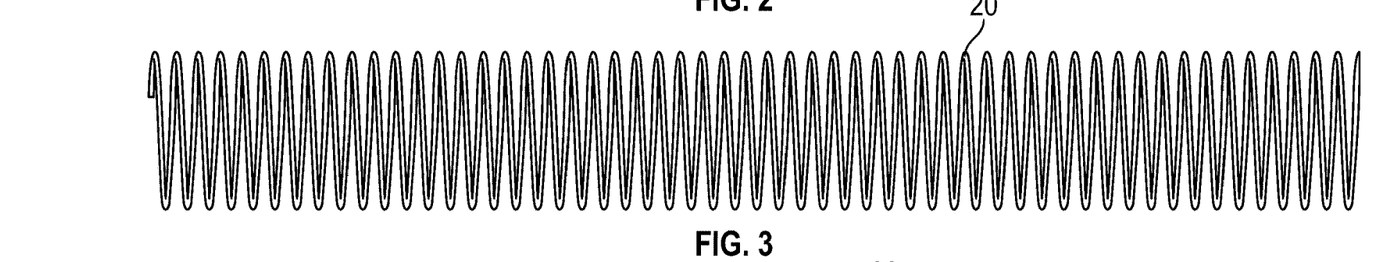
FIG. 3 is a sectional view of the tire assembly of FIG. 1 isolating a first SMA element in accordance with a preferred embodiment of the present invention.
Figure 4:
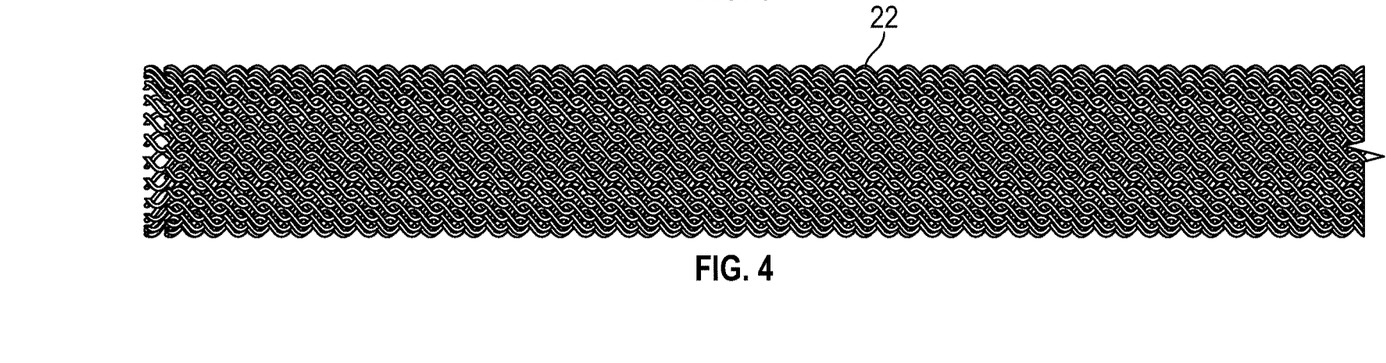
FIG. 4 is a sectional view of the tire assembly of FIG. 1 isolating a second SMA element in accordance with a preferred embodiment of the present invention.
Figure 5:
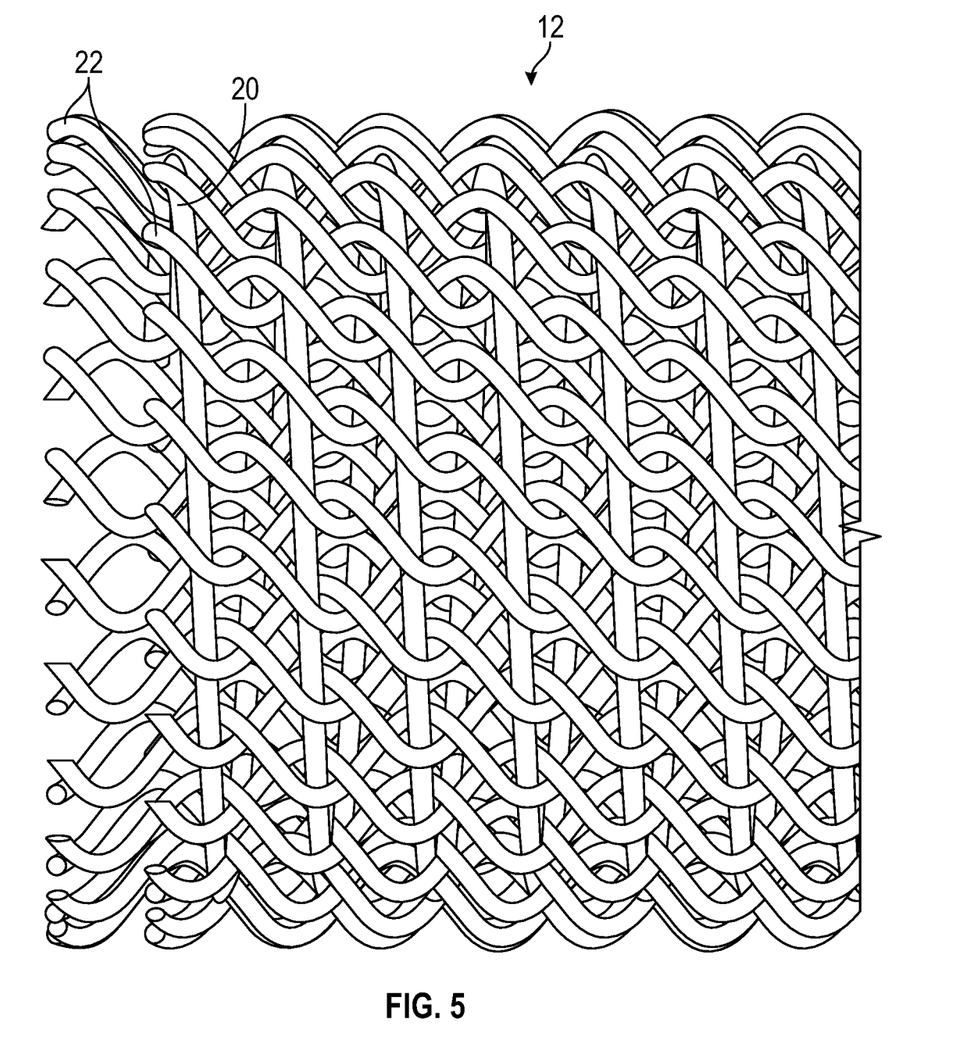
FIG. 5 is a magnified view of the SMAs of the tire assembly of FIG. 1 in accordance with a preferred embodiment of the present invention.

FIG. 2 is a sectional view of the SMA structure 12. The SMA structure 12 includes a first spring 20 and a second spring 22. FIG. 3 is a sectional view of the first spring 20. FIG. 4 is a sectional view of multiple interwoven second springs 22. In some examples, the first spring 20 and/or second spring 22 may be replaced with a wire, sheet, fiber, or foam. Referring back to FIG. 2, the second spring 22 may be woven or threaded around the first spring 20 along a length of the first spring 20 in the directions of the arrows 24. There may be multiple second springs 22 woven or threaded around the first spring 20. The second springs 22 may also be woven or threaded around each other. FIG. 5 is a magnified view of the SMA structure 12 showing the connection between the first spring 20 and the second springs 22. Referring back to FIG. 2, the first spring 20 may have a first diameter 26. The second spring 22 may have a second diameter 28. The first diameter 26 may be greater than the second diameter 28. The second springs 22 may be disposed around an entirety of the first diameter 26. The second springs 22 being connected to the first spring 20 as shown in FIG. 2 maintains a pitch 30 of the first spring 20 constant. Prior to assembling the first spring 20 and the second springs together 22, the pitch 30 may be varied to render the tire assembly 10 (see FIG. 1) harder or softer.

In some examples, the SMA structure 12 may include or have an outer, thin, practically or nearly monomolecular microporous metal coating thereof selected from at least one of zirconium, cerium, lanthanum, nickel, cobalt, tin, titanium, zinc, copper, brass and/or bronze plated. In some examples, a second layer of coating (of any of the materials described above) may be applied, using the same or a different metal. In some examples, a benzotriazole or another corrosion inhibitor may be applied to the SMA structure 12.

In some examples, a prepolymer or resin may be applied to the SMA structure 12 by using a pre-formed mold and a curing process. In some examples, the curing process may include rotational molding, rotational casting, spin casting, injection molding, extrusion, blow molding, thermoforming, expanded bead foam molding, or extruded foam molding.

Figure 6:
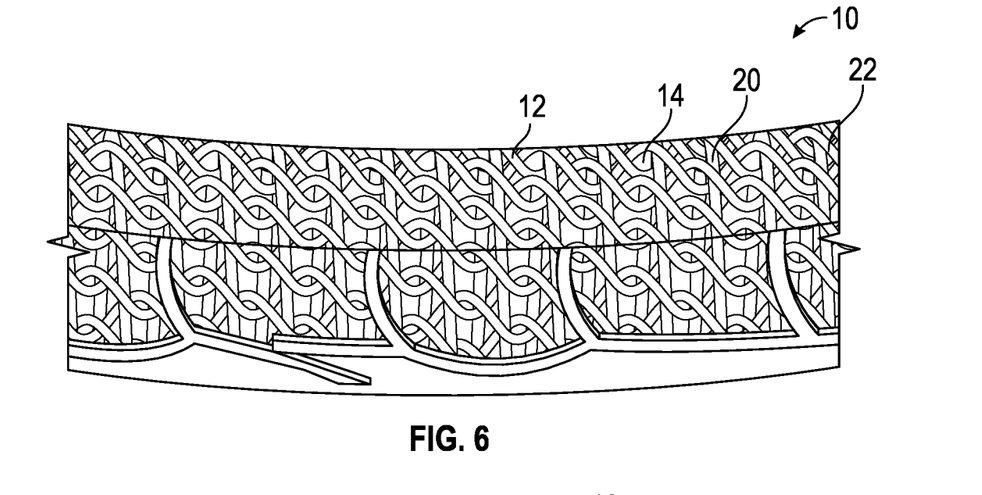
FIG. 6 is a sectional view of the TIRE assembly of FIG. 1 showing SMAs encapsulated in a polymer in accordance with a preferred embodiment of the present invention.

FIG. 6 is a sectional view of the tire assembly 10 showing the SMA structure 12 encapsulated in the polymer member 14. The polymer member 14 may be disposed between the first spring 20 and the second springs 22 such that the space defined by the first diameter 26 (see FIG. 2) remains hollow. Any polymer is within the scope of the present invention. For example, the polymer member 14 may be one of natural rubber, synthetic rubber, vulcanized rubber, polyurethane, nylon, acrylic, or another thermoset or thermoplastic polymer.

In some examples, the polymer member 14 may be 3D printed or additively manufactured onto the SMA structure 12. In some examples, the SMA structure 12 may be bonded to the polymer member 14 using a vulcanizing adhesive, solvent-based adhesive, water-based adhesive, or epoxy. For instance, Chemlok® may be used to bond the SMA structure 12 and the polymer member 14 together.

Figure 7:
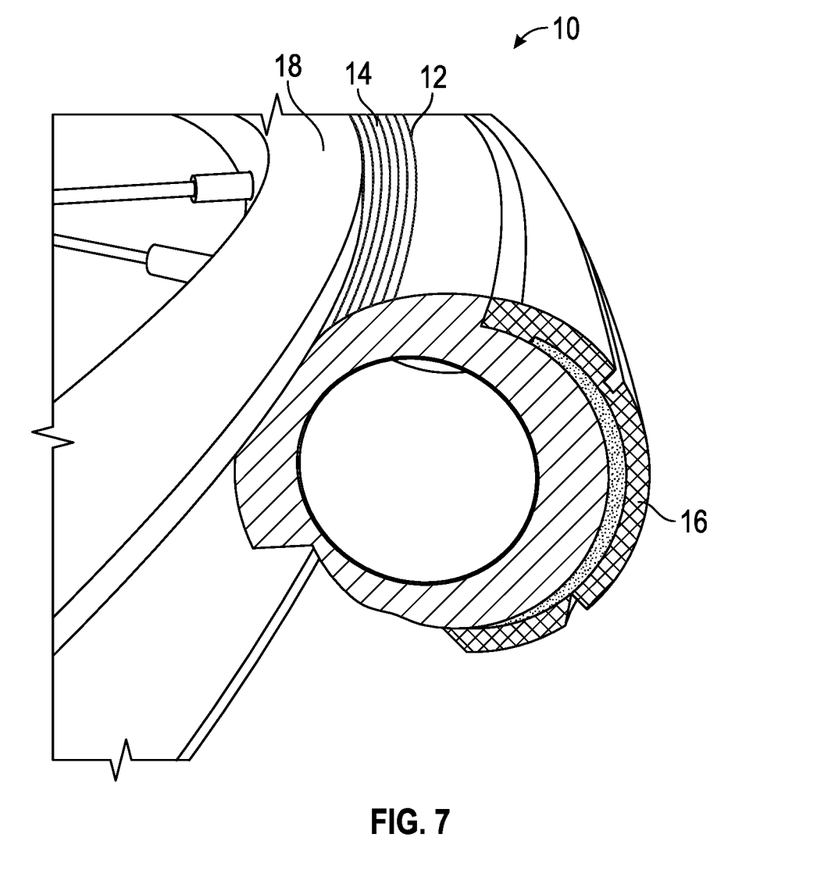
FIG. 7 is a cross-sectional view of the tire assembly of FIG. 1 showing SMAs encapsulated in multiple layers of polymers in accordance with a preferred embodiment of the present invention.

FIG. 7 is a cross-sectional view of the tire assembly 10 showing the SMA structure 12 encapsulated by the polymer member 14 as well as the polymer outer tread 16. The polymer outer tread 16 may provide additional reinforcement to the tire assembly 10. The polymer outer tread 16 may be bonded directly to the polymer member 14. The polymer material or materials of the polymer member 14 may be different than those of the polymer outer tread 16. It will be appreciated that the polymer outer tread 16 may entirely cover the polymer member 14 and the SMA structure 12.

Figure 8:
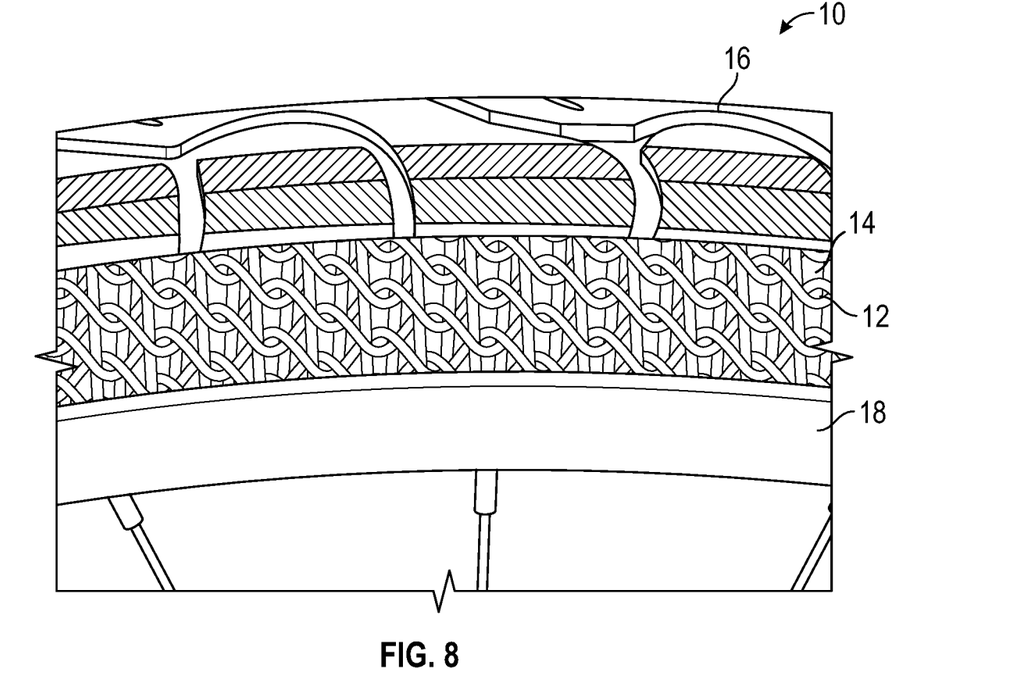
FIG. 8 is a side view of the tire assembly of FIG. 7 in accordance with a preferred embodiment of the present invention.

FIG. 8 is a side view of the tire assembly 10. The polymer outer tread 16 may partially cover the polymer member 14 and the SMA structure 12 as shown in FIG. 8. In some examples, the polymer outer tread 16 may not be enclosing the polymer member 14 and the SMA structure 12 at or near mating surfaces of the rim 18 and the tire assembly 10. A bicycle rim is shown in FIG. 8 by example.

Figure 9:
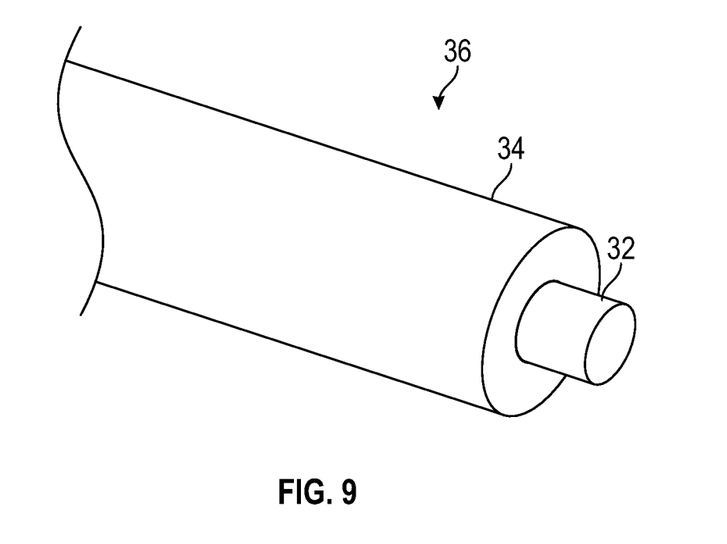
FIG. 9 is a cut-off perspective view of a SMA element under a layer of sheathing material in accordance with a preferred embodiment of the present invention.

FIG. 9 is a cut-off perspective view of an SMA wire 32 under a layer of sheathing material 34. The SMA wire 32 may be utilized in lieu of the first spring 20 (see FIG. 5) and/or the second spring 22 (see FIG. 5) to form an SMA structure. The SMA wire 32 may be used as a core of a drawn filled tube 36. The drawn filled tube 36 may include the sheathing material 34. The sheathing material 34 may be a metal or a polymer. In some examples, the sheathing material 34 may be same as the material of the polymer member 14 (see FIG. 8) and/or the polymer outer tread 16 (see FIG. 8). In some examples, the sheathing material 34 may be same as the material of the SMA wire 32.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein,"

"above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or suboperations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A tire assembly comprising:
   a body defined by a shape memory alloy structure, the shape memory alloy structure comprising a shape memory alloy element; and
   a polymer layer configured to encase the body, wherein the polymer is a first polymer bonded to a second polymer, the first polymer and the second polymer being different materials from each other.

2. The tire assembly of claim 1 wherein the shape memory alloy element comprises at least one of NiTi, Ag—Cd, Au—Cd, Cu—Al—Ni, Cu—Sn, Cu—Zn, Fe—Pt, Mn—Cu, Fe—Mn—Si, Co—Ni—Al, Co—Ni—Ga, Ni—Fe—Ga, Ti—Nb, β—Ti alloys, ternary alloys, or quaternary alloys of a material of the shape memory alloy element.

3. The tire assembly of claim 1 wherein the shape memory alloy element is a wire, sheet, spring, or foam.

4. The tire assembly of claim 1 wherein the polymer is one of natural rubber, synthetic rubber, vulcanized rubber, polyurethane, nylon, acrylic, or another thermoset or thermoplastic polymer.

5. The tire assembly of claim 1 further comprising an outer coating configured to be disposed over the shape memory alloy element, the coating selected from at least one of zirconium, cerium, lanthanum, nickel, cobalt, tin, titanium, zinc, copper, brass, and bronze plated.

6. The tire assembly of claim 5 further comprising a second layer of coating configured to be disposed over the shape memory alloy element, the second layer of coating comprising the same one or more materials of the outer coating or one or more materials different than those of the outer coating.

7. The tire assembly of claim 1 further comprising a benzotriazole or another corrosion inhibitor configured to be applied to the shape memory alloy element.

8. The tire assembly of claim 1 further comprising a prepolymer or a resin configured to be applied to the shape memory alloy element via a pre-formed mold and a curing process.

9. The tire assembly of claim 8 wherein the curing process includes rotational molding, rotational casting, spin casting, injection molding, extrusion, blow molding, thermoforming, expanded bead foam molding, or extruded foam molding.

10. The tire assembly of claim 1 wherein the shape memory alloy element is configured to bond to the polymer via a vulcanizing adhesive, solvent-based adhesive, water-based adhesive, or epoxy.

11. The tire assembly of claim 1 wherein the first polymer and the second polymer are different forms of rubber.

12. A shape memory alloy assembly comprising:
a shape memory alloy structure comprising a first spring and a second spring interwoven with each other, the first spring having a larger diameter than a diameter of the second spring, the shape memory alloy structure having a toroidal shape; and
a polymer layer configured to encase the shape memory alloy structure.

13. A tire assembly comprising:
a body defined by a shape memory alloy structure, the shape memory alloy structure comprising a shape memory alloy element, wherein the shape memory element is a plurality of shape memory alloy elements, wherein the plurality of shape memory alloy elements are mechanically combined, and wherein the plurality of shape memory alloy elements comprise a plurality of springs configured to be interwoven with each other; and
a polymer layer configured to encase the body.

14. The tire assembly of claim 13 wherein the plurality of shape memory alloy elements comprise a spring and a wire, the spring and the wire configured to be interwoven with each other.

15. The tire assembly claim 13 wherein the plurality of shape memory alloy elements are arranged to form a helical or toroidal shape.

16. A tire assembly comprising:
a body defined by a shape memory alloy structure, the shape memory alloy structure comprising a shape memory alloy element; and
a polymer layer configured to encase the body, wherein the polymer is configured to be 3D printed onto the shape memory alloy structure.

* * * * *